Jan. 26, 1926.  1,571,097
H. C. REDMAN
WINDSHIELD ATTACHMENT
Filed Dec. 31, 1923   2 Sheets-Sheet 1
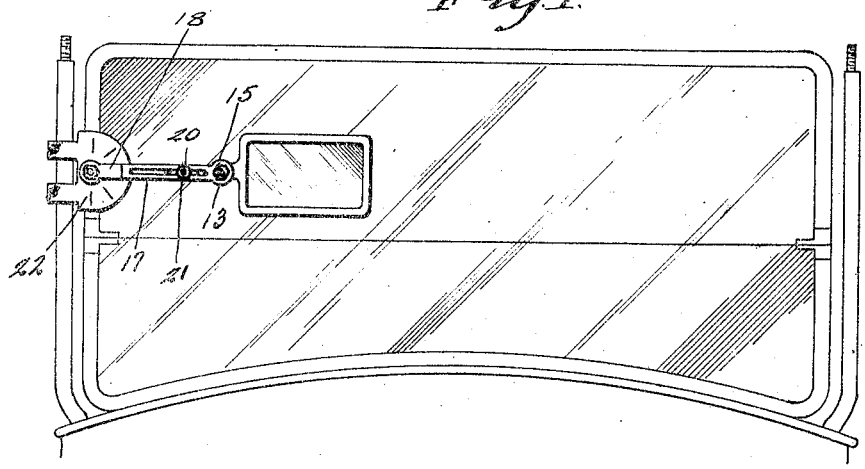
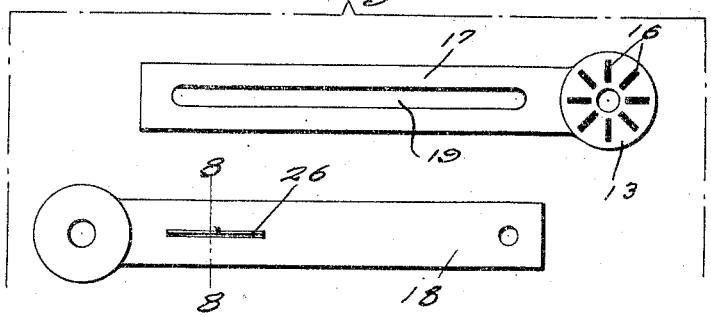
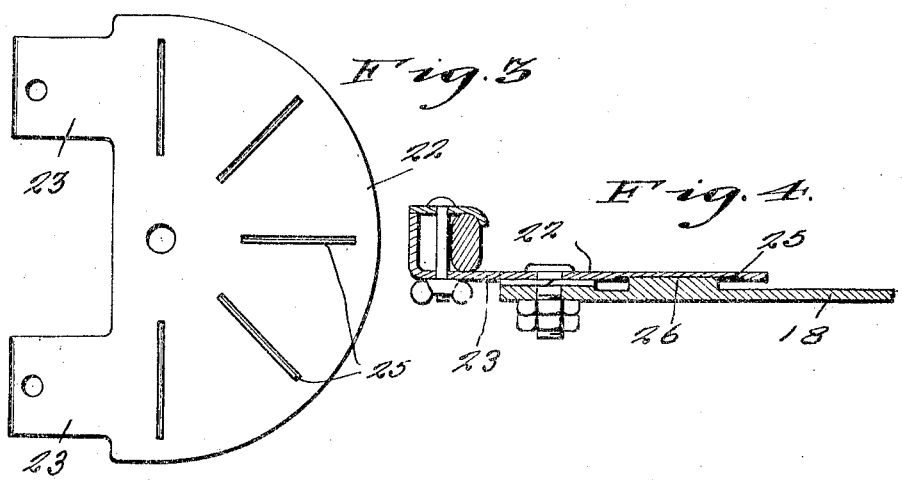
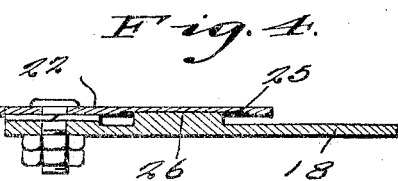
H. C. Redman
INVENTOR
BY *Victor J. Evans*
ATTORNEY
WITNESSES Jan. 26, 1926. 1,571,097
H. C. REDMAN
WINDSHIELD ATTACHMENT
Filed Dec. 31, 1923 2 Sheets-Sheet 2
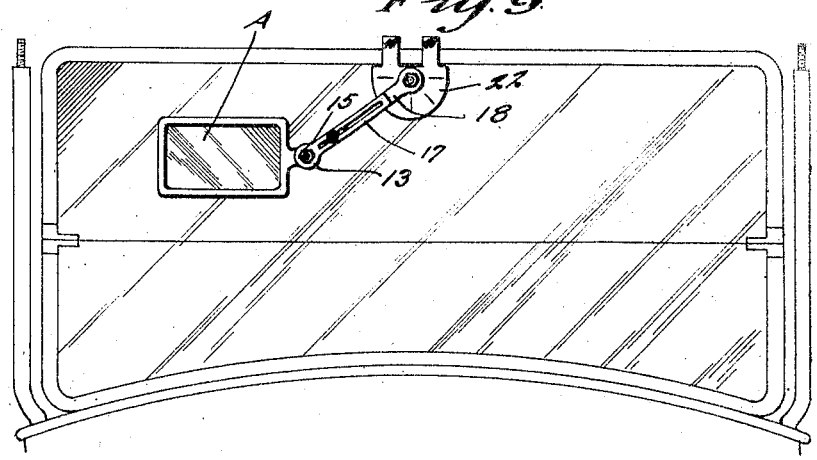
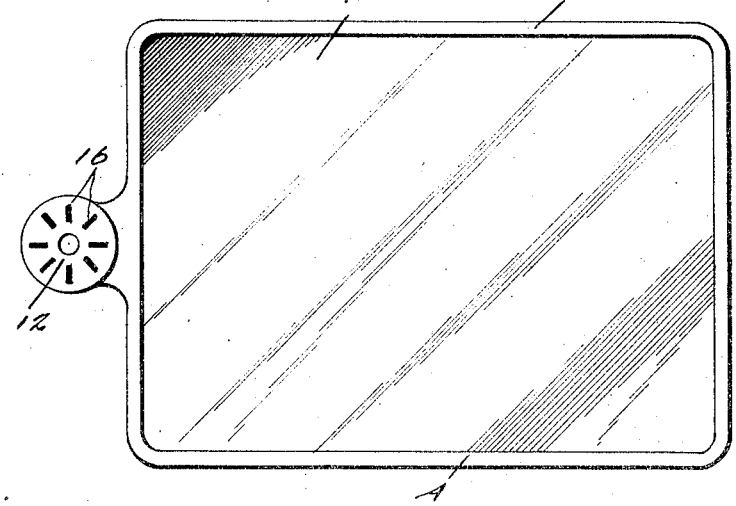
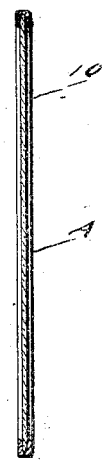
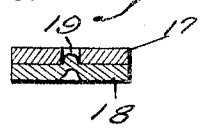
H. C. Redman
INVENTOR
BY Victor J. Evans
ATTORNEY
WITNESSES Patented Jan. 26, 1926.

1,571,097

UNITED STATES PATENT OFFICE.

HENRY C. REDMAN, OF MOORE, MONTANA.

WINDSHIELD ATTACHMENT.

Application filed December 31, 1923. Serial No. 683,762.

*To all whom it may concern:*

Be it known that I, HENRY C. REDMAN, a citizen of the United States, residing at Moore, in the county of Fergus and State of Montana, have invented new and useful Improvements in Windshield Attachments, of which the following is a specification.

It is the purpose of this invention to provide a windshield attachment for motor operated vehicles, in the nature of a shield to protect the eyes of the driver from the glare of headlights on approaching vehicles, which glare frequently impairs the vision of the driver with resultant accidents.

In carrying out the invention I contemplate the use of a shield or protector constructed from some suitable transparent material, such as amber glass or the like which will protect the eyes from glare of headlights as above stated, and mount this shield on a supporting arm so that the shield can be swung to an out of the way position when its use is not desired, and conveniently swung to a position directly in advance of the operator for the purpose specified.

The nature and advantages of the invention will be better understood when the following detailed description, is read in connection with the accompanying drawings, the invention residing in the construction, combination and arrangement of parts as claimed.

In the drawings forming part of this application, like numerals of reference indicate similar parts in the several views, and wherein:

Figure 1 is an elevation of the device associated with the windshield of an automobile.

Figure 2 is an elevation illustrating the arm sections of the parts of the invention.

Figure 3 is an elevation of the segmental plate embodied in the invention.

Figure 4 is a horizontal sectional view of the device.

Figure 5 is an enlarged elevation of the glare shield.

Figure 6 is a vertical sectional view of the same.

Figure 7 is a fragmentary detail sectional view, and

Figure 8 is a similar view of one of the elements embodied in the invention.

Figure 9 is a view similar to Figure 1, but showing the invention supported from the top of the windshield.

Referring to the drawings in detail, A indicates the shield or protector which consists of a metallic frame 10 supporting a transparent panel 11 of any suitable material for the purpose above pointed out. While this panel can be constructed from any suitable material, amber glass or celluloid has been found very useful, and cheap to manufacture. Carried by one side of the frame 10 is an apertured disk 12 which is arranged in confronting relation to the apertured disk like extremity 13 of a supporting arm, which parts are connected together by a bolt and nut 15. By reason of this construction, the shield can be slightly tilted with relation to the arm as shown in the drawings and held in this position by tightening the nut on the bolt which holds the parts together. To assist in holding the shield in this position, the adjacent faces of the disk like members are serrated as at 16. The shield proper can of course vary in size and shape without departing from the spirit of the invention.

The supporting arm for this shield is preferably made in two sections indicated at 17 and 18 respectively, the former being provided with the enlarged extremity above referred to, on which the shield is pivotally mounted. This section 17 is also formed with a longitudinal slot 19 adapted to receive a pin 20 carried by the section 18, so that the length of the arm can be varied to accommodate itself to all conditions and circumstances. This pin is equipped with a nut 21 which when tightened holds the sections of the arm fixed relatively. The section 18 is mounted for pivotal movement on a segmental plate 22 which plate is provided with attaching lugs 23, so that the same can be conveniently secured to the support on one side of the wind shield or to the top thereof as illustrated in the drawings. By reason of this construction, the supporting arm can be swung to an inactive vertical position when the supporting plate is secured to the side of the wind shield, or it can be swung to a horizontal inactive position and arranged on the top of the wind shield. Irrespective however, of whether the attachment is mounted on the side or on the top of the wind shield, the arm can be conveniently swung to an active position when use of the shield is desired, and in which position, the shield is arranged in the line of vision to protect the eyes of the driver from the detrimental effects of the glare of approaching headlights. The supporting plate 22 is preferably formed with shallow grooves 25 which are adapted to receive a tit or the like 26 projecting from the adjacent side of the section 18 of the supporting arm, so that when the arm is swung to an active position, the tit entering the groove will check the movement of the arm and finally support it in this position.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

An anti-glare device comprising a relatively large segmental plate adapted to be positioned at one of the vertical edges of the windshield, a pair of laterally extending parallel U-shaped brackets extending from the inner edge of the plate and adapted to embrace one of the vertical frame members of an automobile, fastening elements associated with the bracket for holding the same to the windshield, the segmental plate being provided with a plurality of radially disposed grooves, two of which being located in vertical alinement, an arm pivoted to the segmental plate, a longitudinal rib formed on the inner face of the arm and engageable in any one of the grooves, a pivotal and binding connection between the inner end of the arm and segmental plate whereby to hold the arm in a position with the tongue and the rib engaged in one of the grooves, and an anti-glare element carried by the inner end of the arm.

In testimony whereof I affix my signature

HENRY C. REDMAN.